(12) United States Patent
Williams

(10) Patent No.: US 7,102,485 B2
(45) Date of Patent: Sep. 5, 2006

(54) MOTION ACTIVATED COMMUNICATION DEVICE

(76) Inventor: Gene Williams, 418 W. 23rd St., Panama City, FL (US) 32405

( * ) Notice: Subject to any disclaimer, the term of this patent is extended or adjusted under 35 U.S.C. 154(b) by 417 days.

(21) Appl. No.: 09/851,488

(22) Filed: May 8, 2001

(65) Prior Publication Data

US 2002/0167392 A1    Nov. 14, 2002

(51) Int. Cl.
*G05B 23/02* (2006.01)
*G10K 11/00* (2006.01)
*H04M 1/64* (2006.01)
*H04M 11/00* (2006.01)
*G10L 21/00* (2006.01)

(52) U.S. Cl. .................. 340/3.3; 367/197; 367/198; 367/199; 379/74; 379/80; 379/88.04; 379/100.08; 704/273; 704/275; 704/246

(58) Field of Classification Search .......... 379/93.17, 379/74, 80, 88.04, 100.08; 367/197, 198, 367/199; 340/3.3; 704/273, 275, 246
See application file for complete search history.

(56) References Cited

U.S. PATENT DOCUMENTS

| | | | |
|---|---|---|---|
| 5,349,636 A * | 9/1994 | Irribarren ................. 379/88.15 |
| 5,400,393 A | 3/1995 | Knuth et al. | |
| 5,406,618 A * | 4/1995 | Knuth et al. ............. 379/88.04 |
| 5,491,774 A * | 2/1996 | Norris et al. ............... 704/270 |
| 5,594,784 A * | 1/1997 | Velius ..................... 379/88.02 |
| 5,604,791 A * | 2/1997 | Lee .......................... 379/88.21 |
| 5,832,062 A | 11/1998 | Drake | |
| 5,949,852 A * | 9/1999 | Duncan ..................... 379/67.1 |
| 6,014,559 A | 1/2000 | Amin | |
| 6,061,718 A | 5/2000 | Nelson | |
| 6,097,941 A | 8/2000 | Helferich | |
| 6,104,788 A | 8/2000 | Shaffer et al. | |
| 6,353,659 B1 * | 3/2002 | Van Ryzin et al. ...... 379/88.12 |
| 6,370,506 B1 * | 4/2002 | Ahluwalia .................. 704/275 |
| 6,483,695 B1 * | 11/2002 | Hartstein .................... 361/680 |
| 2001/0036264 A1 * | 11/2001 | Ito et al. .................. 379/433.1 |

* cited by examiner

*Primary Examiner*—Jeffery Hofsass
*Assistant Examiner*—Scott Au
(74) *Attorney, Agent, or Firm*—Myers & Kaplan LLC; Joel D. Myers, Esq.

(57) ABSTRACT

A motion activated, voice control communications device interactive with voice mail systems and electronic mail systems and effective as a stand-alone unit. In general, when a motion detector detects motion in the vicinity of the device, a microprocessor receives input therefrom to initiate a software command to check for messages. If messages are present, the device provides an audible report stating the number of messages waiting and provides a list of voice commands by which the user may initiate the next action, which may include review, erase or skip message or end session. The presently described communications device can be used in conjunction with voice messaging platforms or electronic messaging systems via a personal computer.

16 Claims, 6 Drawing Sheets

MOTION ACTIVATED COMMUNICATION DEVICE

TECHNICAL FIELD

The present invention relates generally to electronic mail and voice messaging and, more specifically, to a motion activated, voice controlled communication device.

BACKGROUND ART

In today's busy world, many households depend on electronic messaging, voice messaging or answering machines in order to communicate with others. Voice mail and electronic mail have become preferred methods of communicating with family, friends and acquaintances who cannot be reached directly, particularly those who live outside of a local calling area.

Important messages are often left unheard or unread for an extended period of time, sometimes because it can be inconvenient to check for messages. Many people simply forget to sign onto an email system or to promptly check their answering machine or voice mail system for the presence of messages. Moreover, some systems include an automatic deletion feature wherein voice messages and e-mails are automatically removed after a certain number of days, thus resulting in the possibility that some messages are never heard or read.

There are devices available wherein checking for messages is made more convenient. For instance, an audible signal can be provided in the form of a special telephone dial tone to alert a user that unheard voice mail messages are present. This, however, requires a person to go to the telephone to listen for the special dial tone, often to find no messages present. Although visual message indicators such as light accessories are available, such devices are often not effective. For electronic mail, many systems place an indicator on a service provider's home page to indicate whether mail messages are waiting. This disadvantageously requires visual contact and an affirmative act.

An additional inconvenience associated with retrieving messages from voice mail and electronic mail is that one must be within physical proximity of the telephone or the computer in order to provide the telephone pad control or the keyboard and cursor manipulation necessary to control the playback commands.

Electronic message retrieval can be even more restrictive than voice message retrieval because it requires the user to remain at the personal computer in order to access, read and respond to the message. In addition, a user must typically go through a sign-on sequence before they can check for the presence of messages, with no assurance that messages are present. This process wastes time with disadvantageous and irritating inconvenience when no messages are present.

An automatic, convenient method of announcing to a user that messages are present would eliminate this waste of time, increase the convenience of using electronic messaging and/or voice messaging and eliminate unnecessary efforts that result when no messages are present. A new and improved messaging system would free electronic messaging and voice messaging operations from the physical limitations of the workstation or telephone. It is, therefore, to the provision of such an improvement that the present invention is directed.

BRIEF SUMMARY OF THE INVENTION

Briefly described, in a preferred embodiment, the present invention overcomes the above-mentioned disadvantages by providing a motion activated, voice controlled messaging device.

Generally, the present invention, in the preferred embodiment, comprises a motion detector, a voice recognition system, a voice recording unit and a microprocessor.

More specifically, when messages are left on the recording unit, a signal is stored in a microprocessor indicating that messages are present. When motion is detected by the motion detector, the microprocessor audibly announces that messages are waiting. Specific instructions are received by the microprocessor from a vocabulary of voice commands corresponding to desired actions, such as, for exemplary purposes only, "play messages," "delete" or "end session." A timer may be added to the motion detector to limit the time frame in which message announcements are made.

In an alternate embodiment, the motion activated, voice control communication device could be programmed to interface with a user's voice messaging system, wherein the microprocessor could be coupled to an external telephone line. When messages are present, an input signal from the motion detector activates an output signal from the microprocessor to access voice messaging system via the external telephone line. Voice commands are converted to tone frequencies used in the telephone network, wherein the tone frequencies correspond to telephone keypad commands designated by the voice messaging system. Alternatively, the voice commands could be interpreted via a voice recognition system.

In another alternate embodiment, the motion activated, voice control communication device could be programmed to interface with the user's electronic messaging system. The microprocessor could be coupled with a computer interface unit, wherein voice commands could be recognized and converted into control signals to directly create a desired action aided by the operating system of the user's personal computer.

A feature and advantage of the present invention is to provide a new and improved motion activated, voice controlled communication device wherein automatic notification of waiting messages is provided.

Another feature and advantage of the present invention is to provide a new and improved motion activated, voice controlled communication device wherein operation of voice message storage units are freed from physical limitations.

Another feature and advantage of the present invention is to provide a new and improved motion activated, voice controlled communication device wherein hands free control and delivery of voice messages is provided.

Another feature and advantage of the present invention is to provide a new and improved motion activated, voice controlled communication device wherein hands free control and delivery of electronic messages is provided.

These and other objects, features and advantages of the invention will become more apparent to one skilled in the art from the following description and claims when read in light of the accompanying drawings.

DETAILED DESCRIPTION OF THE PREFERRED AND ALTERNATE EMBODIMENTS

In describing the preferred embodiment of the present invention as illustrated in the figures, specific terminology is employed for the sake of clarity. The invention, however, is not intended to be limited to the specific terminology so selected, and it is to be understood that each specific element includes all technical equivalents that operate in a similar manner to accomplish similar functions.

With regard to all such embodiments as may be herein described and contemplated, it will be appreciated that optional features, including, but not limited to, aesthetically pleasing coloration and surface design, and labeling and brand marking, may be provided in association with the present invention, all without departing from the scope of the invention.

Figure 1:
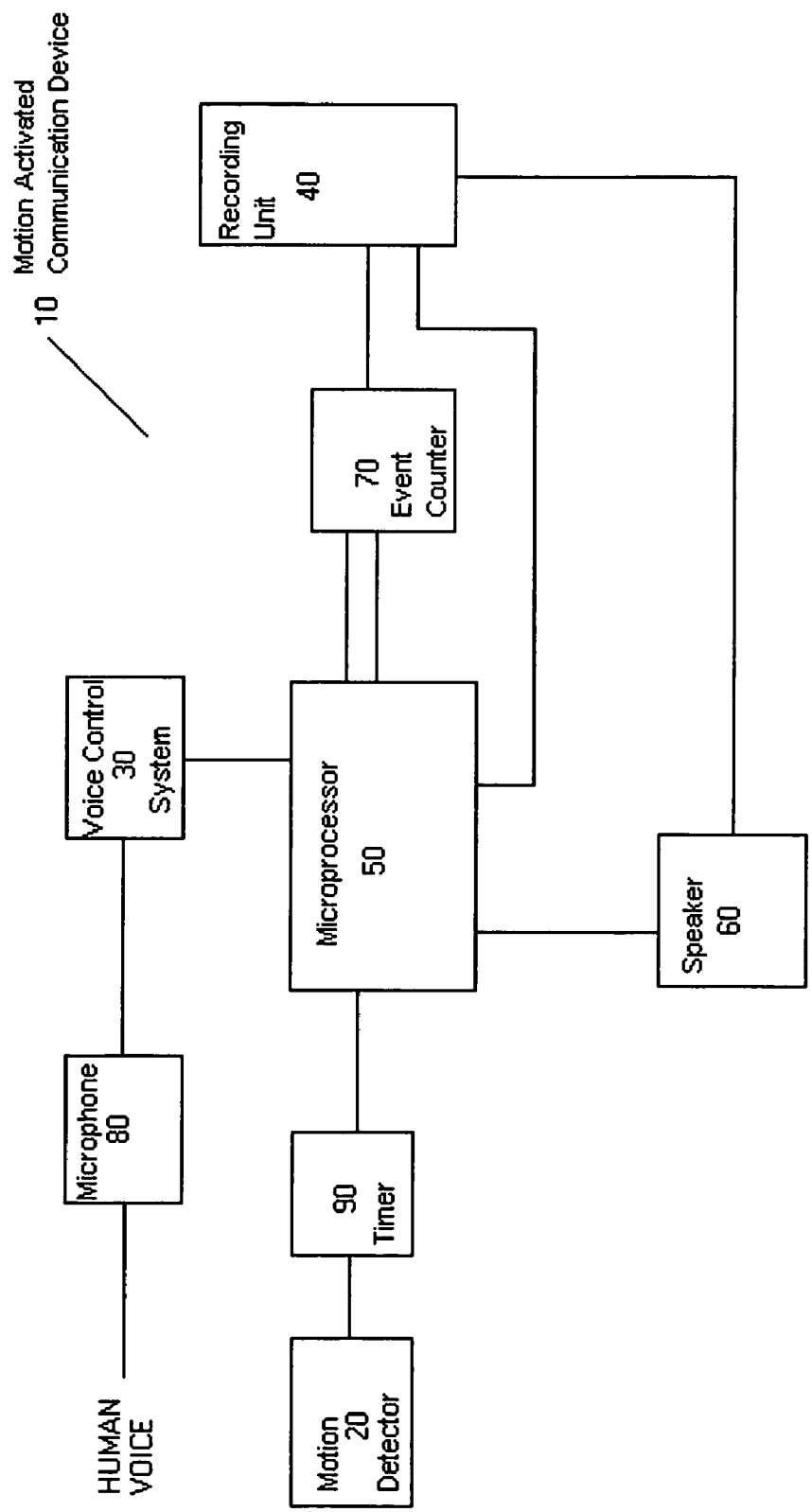
FIG. 1 is a functional block diagram of the present invention, according to a preferred embodiment.
Figure 1A:
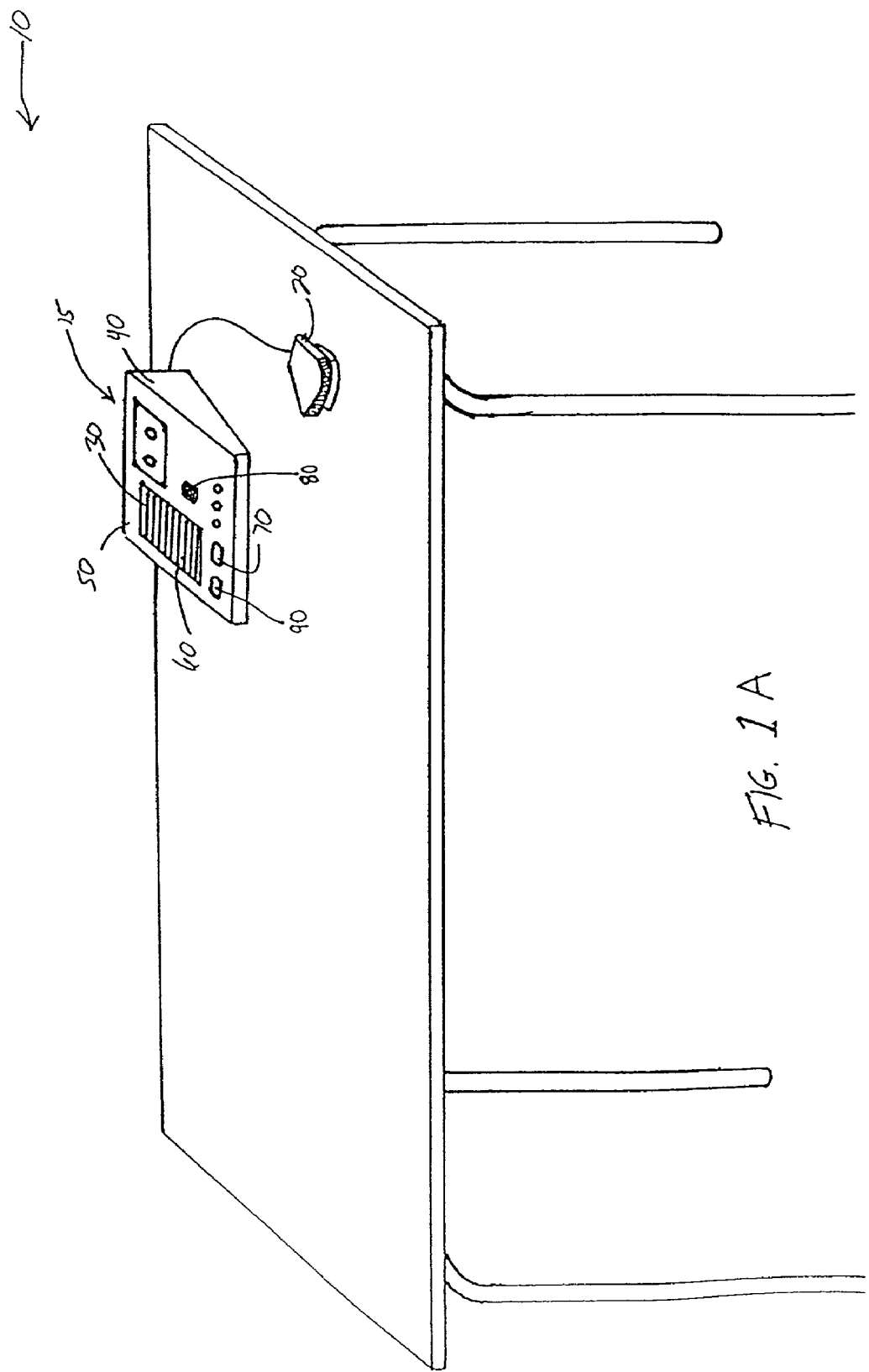
FIG. 1A is a perspective view of the present invention, according to a preferred embodiment.

Now referring to FIGS. 1 and 1A, device 10 generally comprises motion detector 20, voice control system 30, recording unit 40, microprocessor 50, speaker 60 and event counter 70, wherein voice control system 30, recording unit 40, microprocessor 50, speaker 60 and event counter 70 are all shown within unit 15. However, it should be noted that each component of unit 15 may be separate in an alternate embodiment. More specifically, motion detector 20 preferably detects motion within a predetermined range of device 10 and transmits an input signal to microprocessor 50. Motion detector systems are well known within the art. In addition, for exemplary purposes, infrared radiation, optical systems, microwave or any type of motion detection can be used in conjunction with device 10 to detect motion within the vicinity of device 10.

Preferably, upon receipt of signal from motion detector 20, microprocessor 50 audibly announces, via speaker 60, the number of messages waiting. Messages are preferably stored on recording unit 40. For each message stored on recording unit 40, event counter 70 preferably increases by an increment representative of the number of messages received. Event counter 70 is preferably decreased by one increment each time a message is deleted from storage. Event counters are well known within the art.

Once microprocessor 50 announces the number of messages indicated on event counter 70, microprocessor 50 preferably audibly announces to the user via speaker 60 a recorded set of voice commands that the user may use to initiate the next action. Preferably, microprocessor 50 then pauses for a defined time period awaiting a voice command. If no command is issued within the pre-described time period, device 10 preferably repeats the list of options. If no command is received by microprocessor 50 after a predetermined number of requests, device 10 preferably resets to await the next input signal from motion detector 20.

Voice commands are received at microphone 80, wherein microphone 80 is preferably operational in the audio range of human voice. Specific voice commands are predetermined in accordance with the control objective. The voice commands are preferably read by voice control unit 30. Microprocessor 50, upon detecting speech, processes the input signal to recognize the voice command. Preferably, following recognition of the voice command, microprocessor 50 executes the command through the use of a vocabulary of voice commands according to software programming within microprocessor 50.

Microprocessor 50 responds to a vocabulary of delivered voice commands, such as, for exemplary purposes only, "play," "save," "erase" or "end". As one such example, the input command to review messages may be the word "play". When microprocessor 50 receives a command, a programmed response is preferably initiated. In this example, in response to voice command "play", a switch would begin replay of messages. Or, for example, the voice command "end" would end the replay of messages and reset device 10.

Messages are recorded from incoming telephone messages or can be recorded via microphone 80 using a voice command to indicate the desire to record a message, such as, for exemplary purposes only, a reminder that will be delivered at a future, designated date. Microprocessor 50 will deliver a message from storage on the designated date and amend event counter 70 by one increment.

For example, a user can record a reminder message via microphone 80 to initiate an audible reminder on a specified date regarding an appointment, family occasion or event. Such reminder messages can be programmed one-year or more in advance, thereby enabling preset audible reminders for each such recurring event, such as, for exemplary purposes only, birthdays and anniversaries. A user can also record a reminder message by utilizing the telephone line at a remote location. For example, a vacationing user can telephone device 10 to program reminders for events scheduled upon his or her return. In addition, device 10 can be utilized for medical reminders, such as, for exemplary purposes only, scheduled medications, blood pressure or blood sugar checks, treatments or appointments, wherein such medical reminders can be input directly by the user or by a medical professional via telephone access.

Device 10 can be set according to timer 90 to respond to input signal from motion detector 20 only during certain time intervals, such as, for exemplary purposes only, the time of day when the user typically returns from work. As such, device 10 would not respond to motion activation during periods of time outside this time frame.

Figure 2:
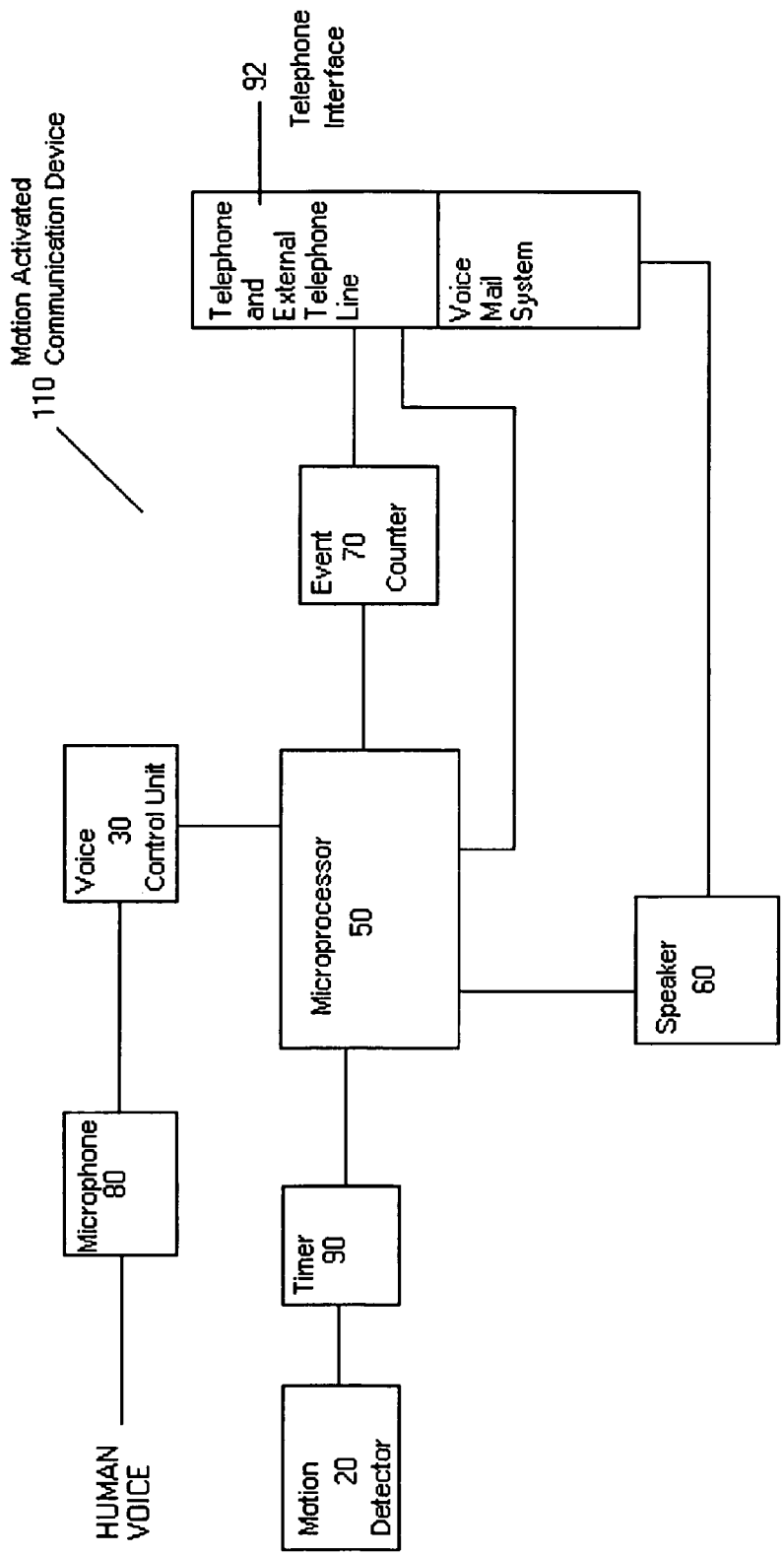
FIG. 2 is a functional block diagram of the present invention, according to an alternate embodiment.
Figure 2A:
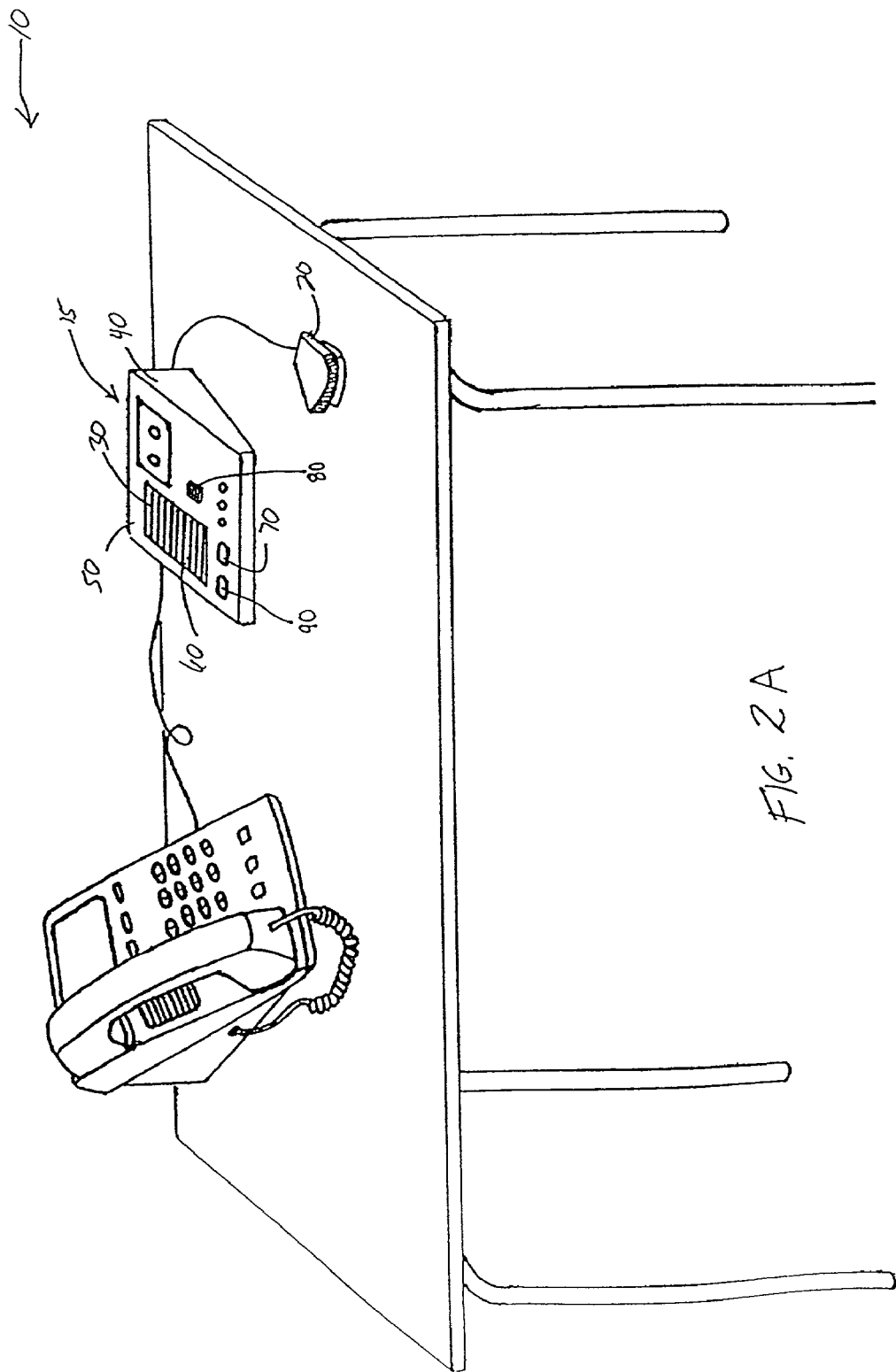
FIG. 2A is a perspective view of the present invention, according to an alternate embodiment.

Referring now to FIG. 2, there is shown an alternate embodiment motion activated, voice control communication device 110 having a voice mail systems interface, wherein alternate device 110 generally comprises motion detector 20, microprocessor 50, voice control unit 30 and telephone interface 92. FIG. 2 illustrates a block diagram for an exemplary alternative embodiment of the present invention.

More specifically, motion detector 20 detects motion within a predetermined range of device 110 and transmits an input signal to microprocessor 50. Motion detector systems are well known within the art. In addition, for exemplary purposes only, infrared radiation, optical systems, microwave or any type of motion detection can be used in conjunction with device 110 to detect motion within the vicinity of device 110.

Upon receipt of signal from motion detector 20, microprocessor 50 audibly announces via speaker 60 that messages are waiting. In the presence of an audible indicator provided with voice messaging systems, such as, for exemplary purposes only, a stuttered dial tone, event counter 70 indicates the presence of messages. An incremental count of messages is not provided.

Once microprocessor 50 announces that messages are waiting, microprocessor 50 audibly announces to the user via speaker 60 a recorded set of voice commands that the user may use to initiate the next action. Microprocessor 50 then pauses for a defined period of time awaiting a voice command. If no command is issued within a certain period of time, device 110 repeats the list of options. If no command is received by the microprocessor 50 after a predetermined number of requests, device 110 resets for the next input signal from the motion detector 20.

Voice commands are received at microphone 80, wherein microphone 80 is operational in the audio range of human voice. Specific voice commands are predetermined in accordance with the control objective. The voice commands are read by voice control unit 30. Microprocessor 50, upon detecting speech, processes the input signal to recognize the voice command. Once it recognizes the voice command, microprocessor 50 executes the command through the use of a vocabulary of voice commands according to software programming within microprocessor 50.

Microprocessor 50 responds to a vocabulary of voice commands which may be delivered, such as "play", "save", "erase" or "end". Microprocessor 50 is coupled to an external telephone line. If, for example, the user utters the command "play" or "review", microprocessor 50, via a pre-programmed sequence of commands, seizes the external telephone line and downloads the local access number to the voice messaging platform. After a pause, the microprocessor 50 downloads password data and an alphanumeric command to retrieve messages or to retrieve new messages only. Control commands associated with the voice mail system are announced via speaker 60. Microprocessor 50 includes communication software for controlling communications in the telephone system, including receiving a voice command transmitted from the telephone when the telephone is off-hook.

As an example, for exemplary purposes only, the input command to review messages may be the word "review". When microprocessor 50 receives a voice command, the command is converted to tone frequencies corresponding to the numeric commands of a telephone keypad. For example, in response to voice command "review", the microprocessor 50 will input a signal to the telephone interface corresponding to the appropriate keypad command to review messages as defined by the voice messaging platform.

Device 110 can be set according to timer 90 to respond to input signal from motion detector 20 only during certain time frames, such as the time of day when the user typically returns from work. As such, the device would not respond to motion activation during periods of time outside this time frame.

Figure 3:
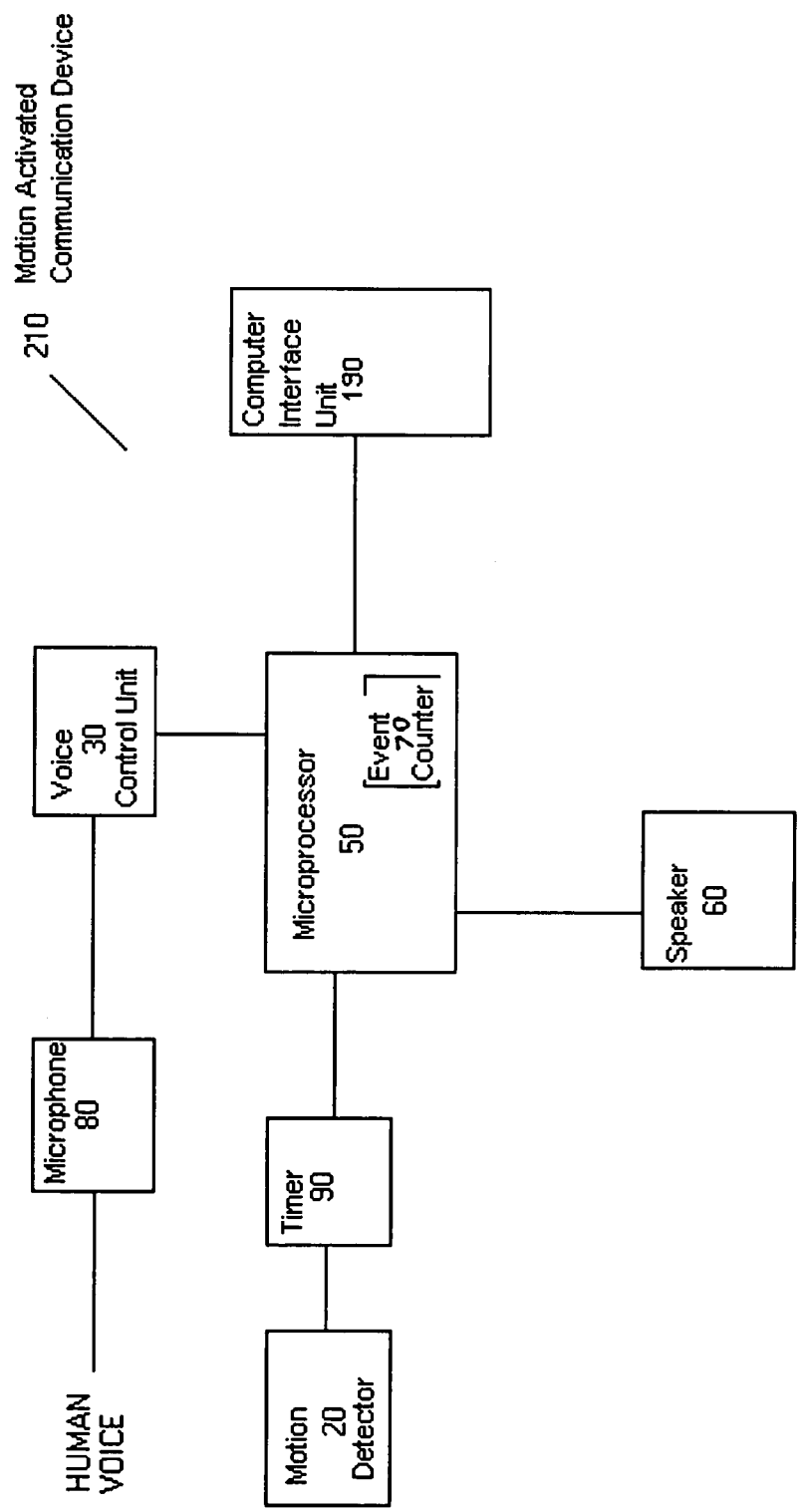
FIG. 3 is a functional block diagram of the present invention, according to an alternate embodiment.
Figure 3A:
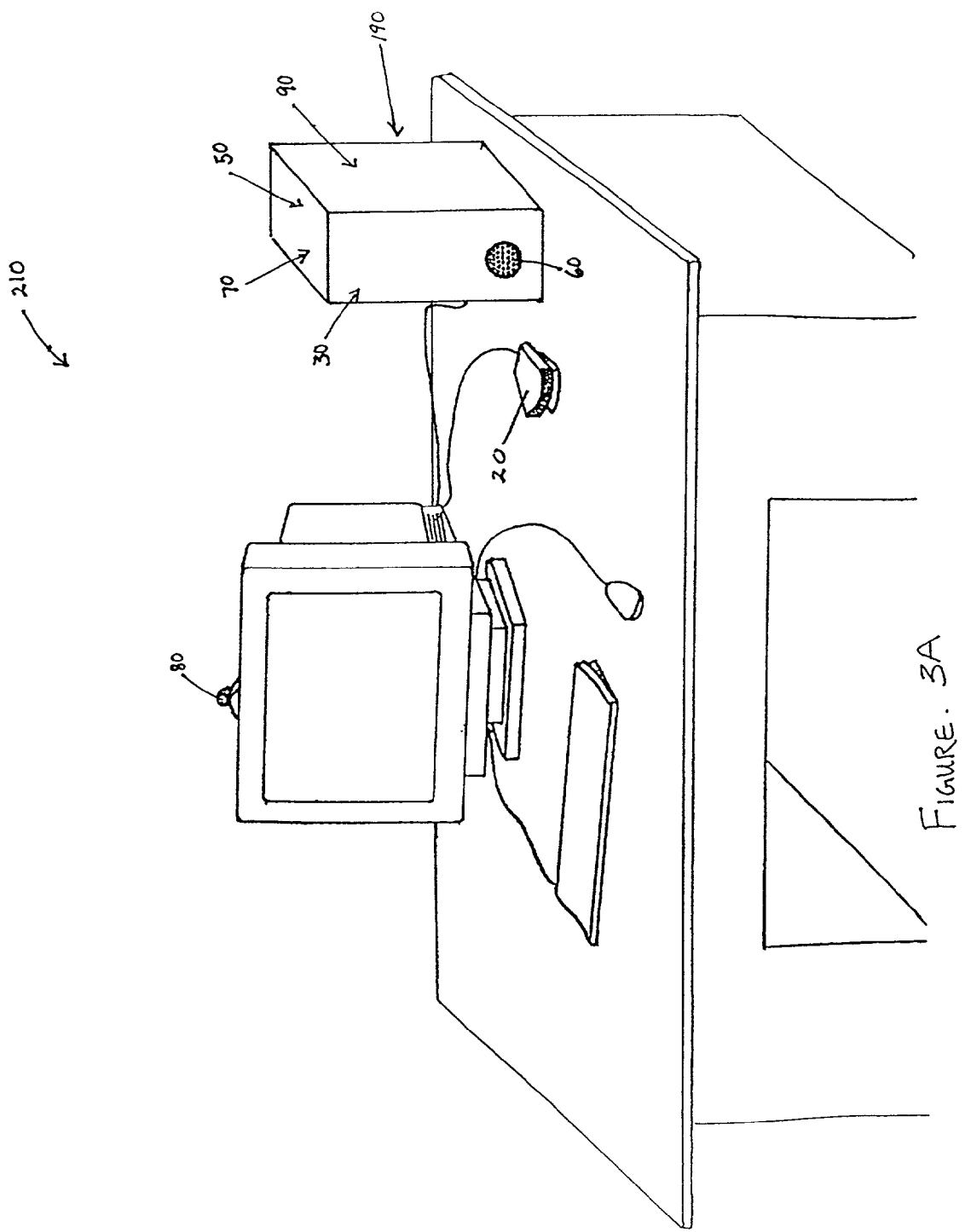
FIG. 3A is a perspective view of the present invention, according to an alternate embodiment.

Referring now to FIG. 3, there is shown an alternate embodiment motion activated, voice control communication device 210, which interfaces with electronic mail systems, generally comprising motion detector 20, microprocessor 50, voice control unit 30 and computer interface unit 190. FIG. 3 illustrates a block diagram for an exemplary alternative embodiment of the present invention. More specifically, motion detector 20 detects motion within a predetermined range of device 210 and transmits an input signal to microprocessor 50. In addition, for exemplary purposes, infrared radiation, optical systems, microwave or any type of motion detection can be used in conjunction with device 210 to detect motion within the vicinity of device 210.

Upon receipt of signal from motion detector 20, microprocessor 50 audibly announces via speaker 60 that electronic mail messages are waiting. In the presence of an indicator provided by the electronic mail system to indicate that messages are present, an event counter 70 within the microprocessor 50 is activated.

Once microprocessor 50 announces that messages are waiting, microprocessor 50 audibly announces to the user via speaker 60 a recorded set of voice commands that the user may use to initiate the next action. Voice commands are substituted for manipulation of a pointing device for control of the motion of a cursor on a computer display. Or, alternatively, voice control unit 30 recognizes the voice command and the computer interface unit 90 converts the voice command into control signals to directly create a desired action aided by the operating system of the user's computer.

Voice commands are received at microphone 80 which is operational in the audio range of human voice. Specific voice commands are predetermined in accordance with the control objective. The voice commands are read by voice control unit 30. Microprocessor 50, upon detecting speech, processes the input signal to recognize the voice command. Once it recognizes the voice command, microprocessor 50 executes the command through the use of a vocabulary of voice commands according to software programming within microprocessor 50.

For example, a user can initiate a reminder message via e-mail to provide an audible reminder on a specified date regarding an appointment, family occasion or event. Such reminder messages can be programmed one-year or more in advance, thereby enabling preset audible reminders for each such recurring event, such as, for exemplary purposes only, birthdays and anniversaries. In addition, device 10 can be utilized for medical reminders, such as, for exemplary purposes only, scheduled medications, blood pressure or blood sugar checks, treatments or appointments, wherein such medical reminders can be input directly by the user or by a medical professional via e-mail access.

Preferably device 210 can be set according to timer 90 to respond to input signal from motion detector 20 only during certain time frames, such as the time of day when the user typically returns from work. As such, the device would not respond to motion activation during periods of time outside this time frame. For business use, an audible reminder could be programmed for immediate delivery to an executive assistant, or for delivery at a predetermined time, thereby eliminating the need for an affirmative action, such as a check of pending e-mails, to ensure timely receipt thereof.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims:

What is claimed is:

1. A communication system for managing messages, comprising:
    means for retrievably storing at least one message onboard;
    means for retrieving said at least one message;
    means for transmitting said at least one message to a user;
    at least one motion detector for detecting motion within a selected range of said communication system, wherein said means for retrievably storing said message, said means for retrieving said message and said means for transmitting said message to a user are in communication with said at least one motion detector, wherein said at least one motion detector transmits a signal upon detection of motion within said selected range of said communication system and activates said means for transmitting said at least one message, wherein upon activation, said means for transmitting said at least one message transmits a message status statement to the user, wherein said means for transmitting said at least one message requires a direct order to perform a task, said direct order selected from a group of orders comprising play, erase, save, repeat, forward, reply, datestamp, playback, stop, and delete, wherein a voice control system receives, recognizes and interprets each said direct order from the user irrespective of the sequence, and directs a microprocessor in accordance with a task objective of each said direct order, and a timer apparatus, wherein operation of said at least one motion detector may be prevented by said timer apparatus.

2. The communication system for managing messages of claim 1, wherein said at least one motion detector is an infrared radiation detector.

3. The communication system for managing messages of claim 1, wherein said at least one motion detector is an optical system.

4. The communication system for managing messages of claim 1, wherein said microprocessor utilizes a software programmed vocabulary to execute said task objective of each said direct order.

5. The communication system for managing messages of claim 1, wherein a message to be delivered to a user may, at the direction of the message creator, be stored for retrieval at a designated date.

6. The communication system for managing messages of claim 1, wherein said means for retrievably storing at least one message is a recording unit, said recording unit enabling receipt, storage and playback of a plurality of messages;

and wherein said means for retrieving said at least one message and said means for transmitting said at least one message to a user comprise said microprocessor, wherein said microprocessor receives said direct orders from a voice control system, said voice control system having a microphone and said voice control system enabling the user to verbally command said microprocessor; a speaker, wherein said speaker is activated by said microprocessor in response to said signal from said at least one motion detector, wherein said speaker audibly announces information regarding status and operation of said recording unit, and wherein said speaker is responsive to said microprocessor via said voice control system and audibly communicates each message of said plurality of messages received and stored by said recording unit and selected for playback; and a message monitoring means.

7. The communication system for managing messages of claim 6, wherein said message monitoring means is an event counter, wherein said event counter increases by an incremental unit for each said message of said plurality of messages received and stored by said recording unit, and wherein said event counter decreases by said incremental unit for each said message of said plurality of messages deleted from said plurality of messages received and stored by said recording unit.

8. The communication system for managing messages of claim 7, wherein said voice control system, said recording unit, said microprocessor, said speaker and said event counter are carried within a housing unit.

9. The communication system for managing messages of claim 6, wherein said recording unit receives each said message of said plurality of messages at least from incoming telephone messages.

10. The communication system for managing messages of claim 6, wherein said recording unit receives each said message of said plurality of messages at least from said microphone.

11. The communication system for managing messages of claim 1, wherein said means for retrieving said message and said means for transmitting said message to a user comprise a microprocessor, wherein said microprocessor receives said signal from said at least one motion detector, wherein said microprocessor includes communication software for controlling communications in a telephone system, and wherein said microprocessor receives commands from a voice control system, said voice control system having a microphone and said voice control system enabling a user to verbally command said microprocessor; a speaker, wherein said speaker is activated by said microprocessor in response to said signal from said at least one motion detector, wherein said speaker audibly announces information regarding status and operation of a voice mail system, and wherein said speaker is responsive to said microprocessor via said voice control system and audibly communicates each message of said plurality of messages received and stored by the voice mail system; and a message monitoring means, wherein said message monitoring means responds to an audible indicator of the voice mail system to indicate the presence of at least one message received and stored by the voice mail system, and wherein said means for retrievably storing a message is a voice mail systems interface, said voice mail systems interface enabling said microprocessor to utilize an external telephone line to access and operate the voice mail system.

12. The communication system for managing messages of claim 11, wherein said microprocessor converts said commands received from said voice control system into corresponding tone frequencies of a telephone keypad.

13. The communication system for managing messages of claim 1, wherein said means for retrieving said message and said means for transmitting said message to a user comprise a microprocessor, wherein said microprocessor receives said signal from said at least one motion detector and wherein said microprocessor receives commands from a voice control system, said voice control system having a microphone and said voice control system enabling a user to verbally command said microprocessor; a speaker, wherein said speaker is activated by said microprocessor in response to said signal from said at least one motion detector, wherein said speaker audibly announces information regarding status and operation of an electronic mail system, and wherein said speaker is responsive to said microprocessor via said voice control system and audibly communicates each message of said plurality of messages received and stored by the electronic mail system; and a message monitoring means, wherein said message monitoring means responds to an indicator of the electronic mail system to indicate the presence of at least one message received and stored by the electronic mail system, and wherein said means for retrievably storing a message is a computer unit interface, said computer unit interface enabling said microprocessor to access and operate the electronic mail system.

14. The communication system for managing messages of claim 13, wherein said microprocessor includes software enabling said microprocessor to direct the electronic mail system via said computer unit interface, wherein said verbal commands from said voice control system are utilized for operative control of a computer unit.

15. The communication system for managing messages of claim 14, wherein said verbal commands from said voice control system are substituted for manipulation of a pointing device for control of motion of a cursor on a computer display and are utilized for operative control of the computer unit.

16. The communication system for managing messages of claim 13, further comprising an audible reminder, wherein said audible reminder is programmable for delivery at a specified time.

\* \* \* \* \*